United States Patent
Koci et al.

(10) Patent No.: US 9,638,131 B2
(45) Date of Patent: May 2, 2017

(54) INTERNAL COMBUSTION ENGINE CYLINDER FLOW DEFLECTOR

(71) Applicant: Caterpillar Inc., Peoria, IL (US)

(72) Inventors: Chad Koci, Washington, IL (US);
Steven C. Zoz, Dunlap, IL (US);
Jonathan Anders, Peoria, IL (US);
Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 287 days.

(21) Appl. No.: 14/498,181

(22) Filed: Sep. 26, 2014

(65) Prior Publication Data

US 2016/0090938 A1    Mar. 31, 2016

(51) Int. Cl.
*F02F 1/18* (2006.01)
*F02F 1/24* (2006.01)
*F02B 23/06* (2006.01)
*F02M 26/05* (2016.01)

(52) U.S. Cl.
CPC .......... *F02F 1/242* (2013.01); *F02B 23/0651* (2013.01); *F02B 23/0672* (2013.01); *F02F 1/18* (2013.01); *F02M 26/05* (2016.02); *Y02T 10/125* (2013.01)

(58) Field of Classification Search
CPC .............. F02B 23/0651; F02B 23/0672; F02B 23/0645; F02B 23/0618; F02F 1/18; F02F 1/242
See application file for complete search history.

(56) References Cited

U.S. PATENT DOCUMENTS

| 2,682,862 | A | * | 7/1954 | Camner | ............... | F02B 3/00 123/276 |
| 4,474,147 | A | * | 10/1984 | Hoopes | ............... | F02F 1/00 123/193.1 |
| 7,438,037 | B2 | | 10/2008 | Oogake et al. | | |
| 7,438,038 | B2 | | 10/2008 | Azevedo et al. | | |
| 7,975,601 | B2 | | 7/2011 | Hittle et al. | | |
| 2011/0232478 | A1 | | 9/2011 | Horigome et al. | | |

FOREIGN PATENT DOCUMENTS

GB          524955 A  *  8/1940  .............. F02B 25/00

* cited by examiner

*Primary Examiner* — Carlos A Rivera
*Assistant Examiner* — Kevin Lathers
(74) *Attorney, Agent, or Firm* — Leydig, Voit & Mayer, Ltd.

(57) ABSTRACT

An internal combustion engine includes a cylinder case forming a cylinder bore having a centerline and an inner bore surface. A piston disposed within the cylinder bore forms a crown surface. A region defined between the piston and the cylinder bore in a radial direction has an annularly shaped mouth opening surrounding the crown surface. A cylinder head is disposed to cover an open end of the cylinder bore such that a variable volume is defined within the cylinder bore between the cylinder head and the piston. The cylinder head also forms a flame deck in fluid contact with the variable volume. A deflector structure forms a portion of the inner bore surface adjacent the flame deck surface, and is disposed between the flame deck and a topmost ring seal groove of the piston when the piston is at a TDC position.

15 Claims, 5 Drawing Sheets

INTERNAL COMBUSTION ENGINE CYLINDER FLOW DEFLECTOR

TECHNICAL FIELD

This patent disclosure relates generally to internal combustion engines and, more particularly, to reciprocating piston engines.

BACKGROUND

Typical internal combustion engines include a reciprocating piston disposed within a cylinder having a closed end. A variable volume created between the piston, the cylinder, and the closed end encloses and compresses a fluid, which can include air, a mixture of air and exhaust gas, a combustible mixture, and other fluids. During operation, combustion of the fuel/air mixture creates hot and expanding exhaust gases, which push the piston along the cylinder. The piston is connected to a crankshaft, which includes an offset lobe connected to the piston via a connecting rod such that power generated during combustion pushes the piston, which in turn causes the crankshaft to rotate and produce useable power.

To lubricate and cool the piston and surrounding engine components, oil is provided to the underside of the piston. This oil also wets the walls of the cylinder, and is scraped off the cylinder walls during operation by appropriate rings that contact the cylinder and are disposed along the outer periphery of the piston.

One type of issue that has historically burdened internal combustion engines is an interaction between fuel and hot combustion products with engine structures within the cylinder. For example, fuel and/or combustion products may contact and collect on areas of the piston and/or the cylinder. Moreover, fuel and/or combustion products may interact with engine structures, in various areas and crevices of the variable volume, especially in a thin cylindrical space between the piston and cylinder within the variable volume and above a topmost piston ring seal. Such interactions may lead to various issues relating to engine durability such as shellacking of deposits on the top portion (cuff) of the cylinder, which may interfere with the proper and efficient operation of the engine.

SUMMARY

In one aspect, the disclosure describes an internal combustion engine. The internal combustion engine includes a cylinder case forming a cylinder bore, which has a centerline and an inner bore surface that at least partially defines a variable volume. The internal combustion engine further includes a piston slidably and sealably disposed within the cylinder bore. The piston forms a crown surface and includes a topmost ring seal groove. A region having a generally hollow cylindrical shape is defined between the piston and the cylinder bore in a radial direction with respect to the centerline. The region has a mouth opening with an annular shape that surrounds the crown surface and is defined between the piston and the cylinder bore. A cylinder head is disposed to cover an open end of the cylinder bore such that the variable volume is defined within the cylinder bore between the cylinder head and the piston. The cylinder head forms a flame deck in fluid contact with the variable volume. A deflector structure forms a portion of the inner bore surface adjacent the flame deck. The deflector structure is disposed between the topmost ring seal groove and the flame deck in an axial direction with respect to the centerline when the piston is disposed at a top dead center (TDC) position within the cylinder bore in the axial direction.

In another aspect, the disclosure describes an internal combustion engine having a cylinder bore formed in a cylinder case. The cylinder bore has a centerline and an inner bore surface that at least partially defines a variable volume. A cylinder head is disposed to cover an open end of the cylinder bore such that the variable volume is defined within the cylinder bore between the cylinder head and a piston. The cylinder head forms a flame deck in fluid contact with the variable volume, and the piston is slidably and sealably disposed within the cylinder bore. The piston forms a crown surface and a topmost ring seal groove, which is adapted to accommodate a ring seal disposed for sealing and sliding engagement with the inner bore surface. A region having a generally hollow cylindrical shape is defined between an outer wall of the piston and the inner bore surface in a radial direction with respect to the centerline. The region has an annularly shaped mouth opening disposed radially outward relative to the crown surface and defined between the piston and the cylinder bore. The region is further defined between the topmost ring seal groove and the annularly shaped mouth opening in an axial direction with respect to the centerline. A deflector structure forms a portion of the inner bore surface adjacent the flame deck. The deflector structure is disposed between the flame deck and the topmost ring seal groove in the axial direction when the piston is at a top dead center (TDC) position within the cylinder bore. In one embodiment, the deflector structure includes a concave depression formed in a body portion of the deflector structure. The concave depression defines a space that is disposed outwardly in the radial direction with respect to the annularly shaped mouth opening. The piston is moveable between the TDC position and a bottom dead center (BDC) position in the axial direction such that the crown surface of the piston is closest to the flame deck when the piston is at the TDC position in the axial direction.

In yet another aspect, the disclosure describes an internal combustion engine having a cylinder bore formed in a cylinder case. The cylinder bore has a centerline and an inner bore surface that at least partially defines a variable volume, a cylinder head disposed to cover an open end of the cylinder bore such that the variable volume is defined within the cylinder bore between the cylinder head and a piston, the cylinder head forming a flame deck in fluid contact with the variable volume, and the piston being slidably and sealably disposed within the cylinder bore. The piston forms a crown surface. The internal combustion engine comprises a topmost ring seal groove formed in the piston and adapted to accommodate a ring seal disposed for sealing and sliding engagement with the inner bore surface. A region has a generally hollow cylindrical shape defined between an outer wall of the piston and the inner bore surface in a radial direction with respect to the centerline. The region has an annularly shaped mouth opening disposed radially outward from the crown surface. The region is defined between the piston and the cylinder bore, and is further defined between the topmost ring seal groove and the annularly shaped mouth opening in an axial direction with respect to the centerline. A deflector structure forms a portion of the inner bore surface adjacent the flame deck, and is disposed between the flame deck and the topmost ring seal groove in the axial direction when the piston is at a top dead center (TDC) position within the cylinder bore. The deflector structure includes a generally convex protrusion formed in a body portion of the deflector structure and extends radially inwardly to overhang a portion of the annularly shaped mouth opening. The piston is moveable between the TDC position and a bottom dead center (BDC) position in the axial direction. The crown surface of the piston is closest to the flame deck when the piston is at the TDC position in the axial direction.

DETAILED DESCRIPTION

This disclosure relates to internal combustion engines having reciprocating pistons operating within cylinders formed in a cylinder block. In the embodiments illustrated herein, flow deflectors are disposed above a top surface of the piston to deflect combustion products and/or and fuel plumes from interacting with engine structures, thus avoiding or minimizing issues associated with such interactions that can reduce engine component durability. For the sake of illustration of the various base engine components, an internal combustion engine 100 is shown in the block diagram of FIG. 1, and a fragmented view of an engine cylinder 104 is shown in FIG. 2.

The engine 100 includes cylinder block 102 that forms a plurality of engine cylinders 104. In the illustrated embodiment, the engine 100 includes six cylinders 104 arranged in an inline configuration but any other number of cylinders, including a single cylinder, can be used, as well as any other cylinder configuration, such as a V-configuration. As shown in FIG. 2, each cylinder 104 includes a bore 106 slidably accepting therewithin a piston 108. As is known from typical engine applications, pistons can be connected to an engine crankshaft (not shown), which operates to provide a force tending to move each piston within the cylinder bore, for example, during a compression stroke, as well as can be moved by a force applied by the piston to rotate the crankshaft, for example, during a combustion or power stroke.

The cylinder 104 defines a variable volume 110 that, in the illustrated orientation, is laterally bound by the walls of the bore 106 and is closed at its ends by a top portion or crown of the piston 108 and by a flame deck 112 of the cylinder head 113, which is typically referred to as the lowermost surface of the cylinder head that is open to the cylinder. As shown, the cylinder 106 is formed within a hollow cylindrical sleeve 107 disposed within a bore 109 formed in the cylinder block 102, but other configurations may be used. The variable volume 110 changes between maximum and minimum capacity as the piston 108 reciprocates within the bore 106. In this respect, the piston 108 continuously reciprocates between a bottom dead center (BDC) position, in which the piston 108 is retracted by a maximum distance within the bore 106, and a top dead center (TDC) position, in which the piston 108 is inserted at a maximum extent within the bore 106.

Figure 1:
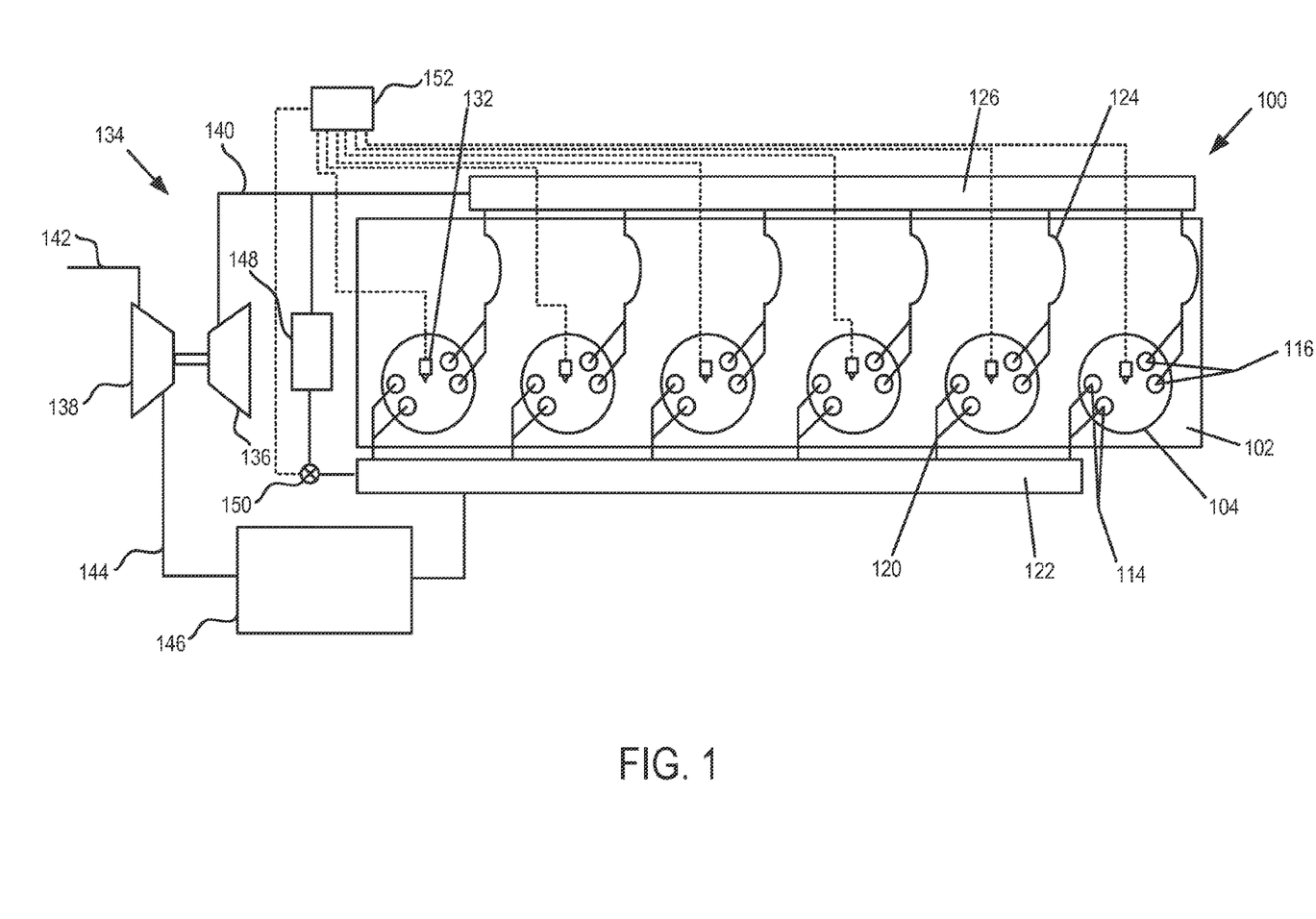
FIG. 1 is a block diagram of an engine in accordance with the disclosure.
Figure 2:
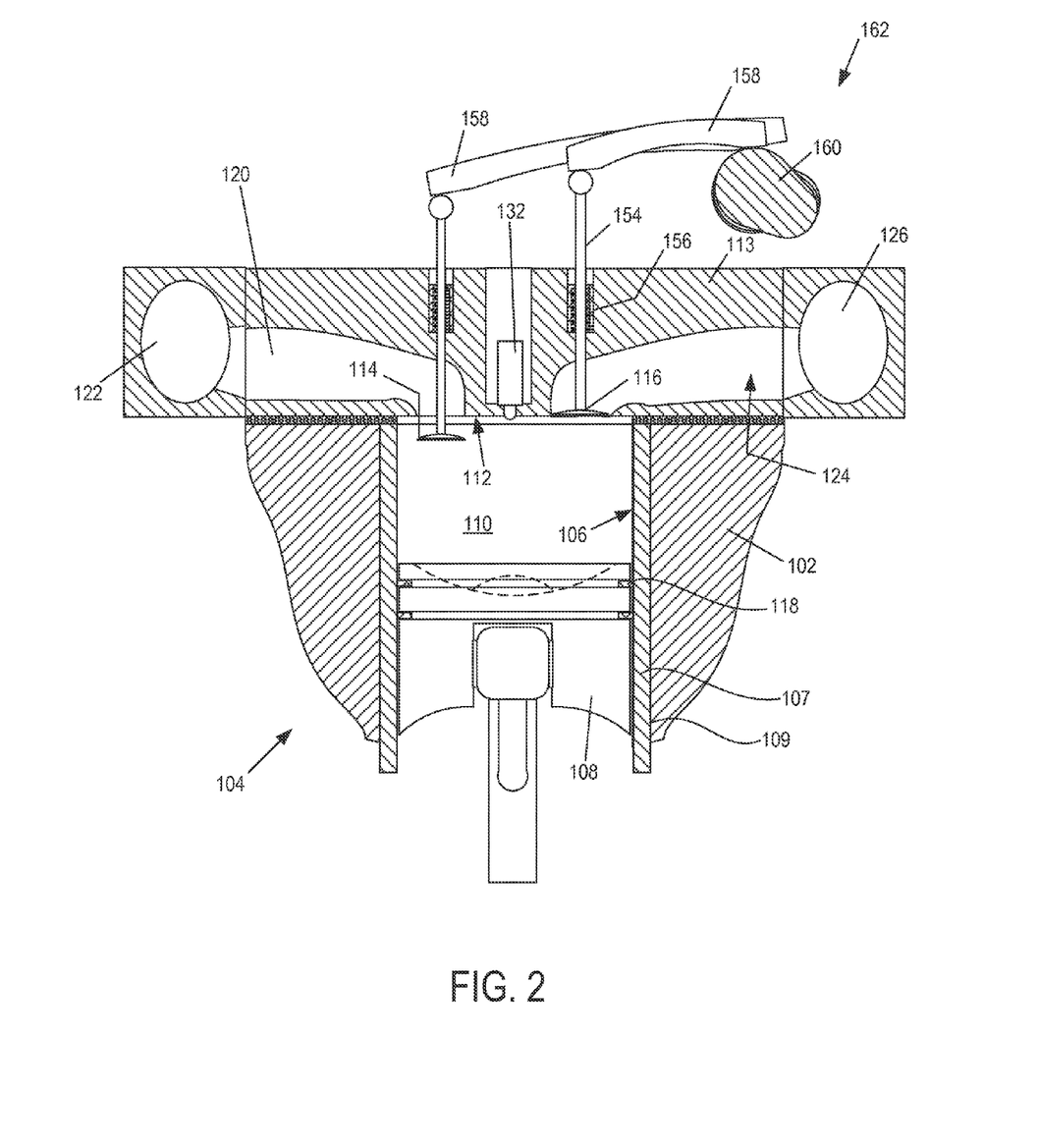
FIG. 2 is a fragmented view of an engine cylinder in accordance with the disclosure.

In reference to FIG. 1, each cylinder 104 includes at least one intake valve 114 (two shown) and at least one exhaust valve 116 (two shown). The intake and exhaust valves 114 and 116 are selectively activated to fluidly connect the variable volume 110 with sinks and sources of fluids during operation of the engine 100. Specifically, the intake valve 114 selectively blocks an intake passage 120 that fluidly interconnects the variable volume 110 with an intake manifold 122. Similarly, the exhaust valve 116 selectively blocks an exhaust passage 124 that fluidly interconnects the variable volume 110 with an exhaust manifold 126. A fuel injector 132 is disposed to inject fuel within variable volume 110 (FIG. 2) at appropriate times during operation.

In the exemplary embodiment of the engine 100 shown in FIG. 1, the engine 100 includes a turbocharger 134 having a turbine 136 connected to a compressor 138, but other configurations, such as multi-staged, series or parallel turbocharger configurations may be used. During operation of the engine 100, exhaust gas collected in the exhaust manifold 126 is provided to drive the turbine 136, in a known fashion, through an exhaust conduit 140. Exhaust conduit and after-treatment components disposed downstream of the turbine 136 are not shown in FIG. 1 for simplicity, but any appropriate configuration may be used.

The turbine 136 drives the compressor 138, which compresses filtered, ambient air from an intake duct 142 to provide compressed, charge air to an air conduit 144. The air conduit 144 includes an optional charge air cooler (CAC) cooler 146, which cools the charge air before it is provided to the intake manifold 122. The illustrated engine 100 further includes a high pressure loop (HPL) exhaust gas recirculation (EGR) system, but other types of EGR systems such as low or intermediate pressure systems may be used. Depending the requirements of the specific engine application, the EGR system may be omitted entirely. In the illustrated embodiment, the EGR system includes an EGR cooler 148 that fluidly interconnects the exhaust manifold 126 with the intake manifold 122 such that cooled exhaust gas can be provided to the intake of the engine. An EGR valve 150 is disposed to meter the amount of exhaust gas recirculated in this fashion.

The engine 100 further includes an electronic controller 152. The electronic controller 152 may be a single controller or may include more than one controller disposed to control various functions and/or features of the engine 100 and/or features of a vehicle or machine in which the engine 100 is installed. For example, a master controller, used to control the overall operation and function of a machine, may be cooperatively implemented with a motor or engine controller used to control the engine 100. In this embodiment, the term "controller" is meant to include one, two, or more controllers that may be associated with the engine 100 and that may cooperate in controlling various functions and operations of the engine 100 (FIG. 1), or any other embodiments for engines described hereinafter. The functionality of the controller, while described conceptually in the present disclosure to include various discrete functions for illustrative purposes only, may be implemented in hardware and/or software without regard to the discrete functionality shown. Accordingly, various interfaces of the controller are described relative to components of the engine 100 shown in FIG. 1, but such interfaces are not intended to limit the type and number of components that are connected, nor the number of controllers that are described.

Accordingly, the controller 152 is associated with each of the fuel injectors 132 and the EGR valve 150 and configured to selectively control their operation. The controller 152 is further associated with sensors and actuators of the engine such as crankshaft and/or camshaft position sensors (not shown), engine speed and/or torque sensors (not shown), and other known sensors and actuators that participate in providing functions and information to the controller 152 to control and monitor engine operation.

In the embodiment illustrated in FIG. 2, valve activation is accomplished by a traditional cam-follower arrangement or any other suitable valve activation arrangement. More specifically, each of the intake and exhaust valves 114, 116 has a respective valve stem 154 that pushes the valve to open against a respective closing spring 156. Each valve stem 154 is pushed by a valve bridge 158 that follows a respective lobe 160 of a rotating camshaft 162 in the known fashion. The rate of rotation of the camshaft may depend on the particular mode of engine operation such as 4-stroke operation, 6-stroke operation, and others.

Figure 3:
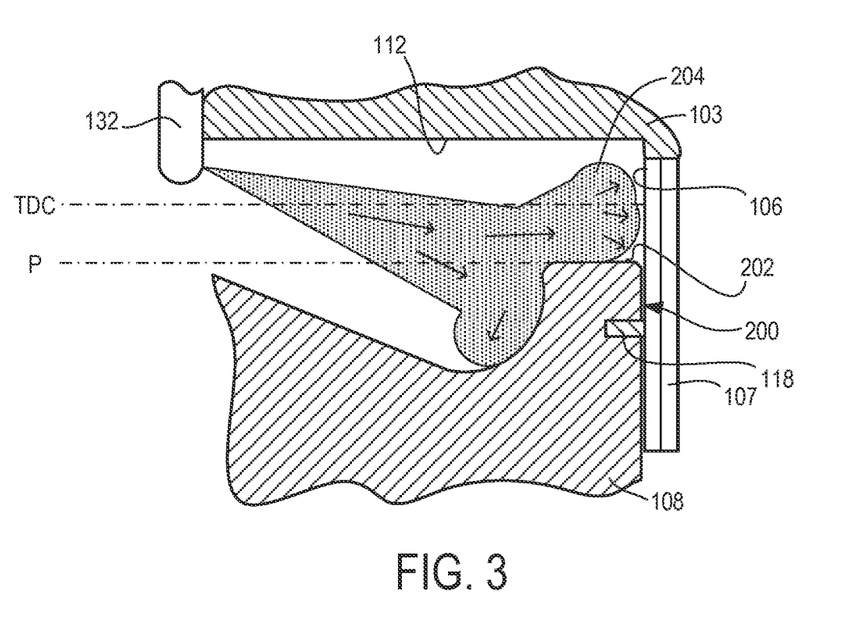
FIGS. 3 and 4 are partial, fragmented views of engine cylinders during operation.
Figure 4:
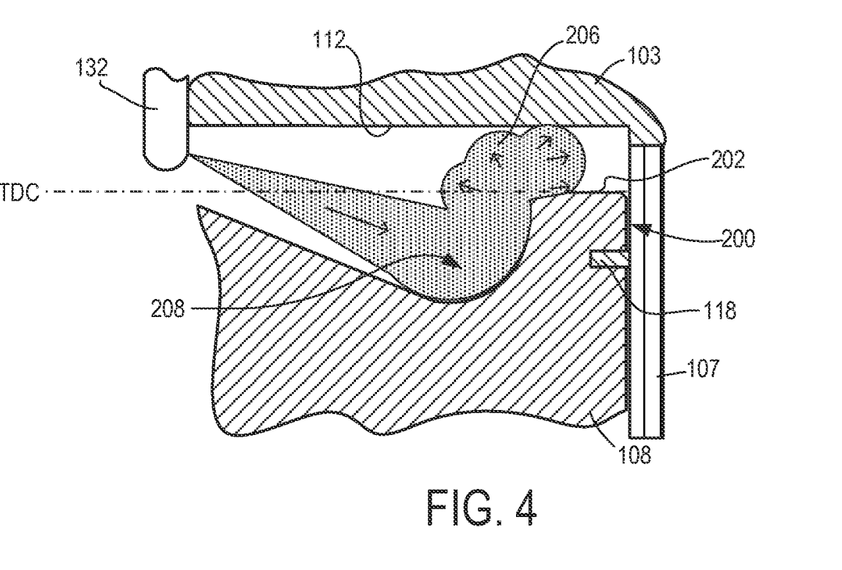

Most engine operating cycles will include an intake stroke, in which air or a mixture of air with exhaust gas will be admitted into the variable volume 110, and a compression stroke, in which the piston moves from the BDC position towards the TDC position. At an intermediate position of the piston during the compression stroke, during an expansion stroke, and/or during a fuel injection carried out while the cylinder is undergoing an expansion stroke, the injector may inject fuel within the variable volume to create a combustible mixture that ignites and/or burns to create expanding gases that push the piston during the power stroke. While the injection and/or combustion are occurring, fuel from the fuel injector and/or combustion products may move or waft towards the region between the piston, cylinder bore, and topmost ring seal of the cylinder, thus creating an interaction condition between the fuel and/or combustion products and the engine structure. In certain applications, for example, in engines operating with retarded ignition timing, the piston may be at 20 or 30 degrees after TDC at the time when the fuel and/or combustion products reaches the region between the top of the piston and the cylinder wall. Additionally, combustion gases and other combustion products, such as soot, which may tend to follow the path of the fuel injected into the variable volume, may follow a similar path. It is estimated that fuel and/or combustion products may reach this region by at least one of two known mechanisms, as illustrated in FIGS. 3 and 4. In these and the remaining illustrations that follow, structures and features that are the same or at least similar to corresponding structures and features previously described are denoted by the same reference numerals previously used for illustration purposes only, and should not be understood to limit the invention, as recited in the appended claims, in any way.

Accordingly, FIG. 3 represents a partial, fragmented view of a portion of the piston 108 (FIG. 2) disposed within the cylinder 106. A region 200 having a generally hollow-cylindrical shape is defined between an outer wall of the piston 108 and the inner wall of the bore 106 in a radial direction with respect to a centerline of the bore 106. The region 200 is further defined between a topmost piston ring seal 118 and a crown surface 202 of the piston 108 in an axial direction along a centerline of the bore 106. As shown, the crown surface 202 of the piston 108 illustrated is a flat, annular surface surrounding a piston bowl and forming the topmost portion of the piston, but it should be appreciated that the crown surface can be embodied with differently shaped structures for different piston types and designs. In the illustration of FIG. 3, the piston 108 is at a position, P, and is moving towards, in the case of compression, or away from, in the case of expansion, a TDC position within the bore 106. As shown, a fuel plume 204 is being injected from a corresponding orifice in the tip of the injector 132. The fuel plume and/or a combustion product plume that is created when the fuel is burned may be part of a pre-injection, e.g., during the compression stroke, a main injection, which may be initiated when the piston is around the TDC position, or a post-injection, e.g., during a combustion or power stroke. As is typical, the tip of the injector 132 may include more than one fuel injection orifice, for example, six or eight orifices, each of which may inject a fuel plume 204 at the same time, but only one plume 204 is shown in these illustrations for simplicity.

The first mechanism for fuel and/or combustion product incursion into the region 200 can be discussed in reference to FIG. 3, where it is shown that at least a portion of the fuel plume 204 may be pointed directly towards the top mouth opening of the region 200 and/or the crown surface 202 of the piston 108. In this way, fuel from the plume 204 may be delivered or deflected directly into the region 200, and may enter the region 200 when fuel is sprayed over the top of the piston 108 towards the wall of the bore 106. Repeated deposition of fuel and/or soot or other combustion products into the region 200, which is not scraped by the topmost ring 118, may cause an undesired buildup of material in that region.

In reference to FIG. 4, which also represents a partial, fragmented view of a portion of the piston 108 (FIG. 2) disposed within the cylinder 106, the piston 108 is at about the TDC position (i.e., within about 10 degrees of crankshaft rotation) within the bore 106. As shown, a fuel plume and/or a combustion product plume 204 is injected from a corresponding orifice in the tip of the injector 132 into a bowl 208 formed at the top of the piston 108, and deflected towards the flame deck 112. As before, the plume 206 may be part of a pre-injection, e.g., during the compression stroke, a main injection, which may be initiated when the piston is around the TDC position, or a post-injection, e.g., during a combustion or power stroke.

The second mechanism for fuel incursion into the region 200 can be discussed in reference to FIG. 4, where fuel deflected or recirculated from the flame deck 112 wafts towards the top mouth opening of the region 200 and/or the crown surface 202 of the piston 108, which is now at the TDC position and close to the flame deck 112. In this way, fuel and/or combustion products from the plume 206 may be delivered or deflected directly into the region 200.

To avoid incursion of fuel and/or combustion products into the region 200, the plume provided by the injector 132, for example, the plumes 204 and 206, may be redirected by appropriate structures placed above the topmost piston ring axial position in the bore when the piston is at the TDC position, and the flame deck 112. Such appropriate structures, which are referred to herein as deflector structures, are configured to recirculate fuel and/or combustion products in an area above the crown surface of the piston, and may operate deflect or redirect fuel and/or combustion products away from or past a mouth opening of the region between the piston and the cylinder walls such that deposition of material within that region, which is not subject to scraping during operation, can be avoided. Two alternative and exemplary embodiments are shown in FIGS. 5 and 6, each of which represents a respective partial, fragmented view of a portion of the piston 108 (FIG. 2).

Figure 5:
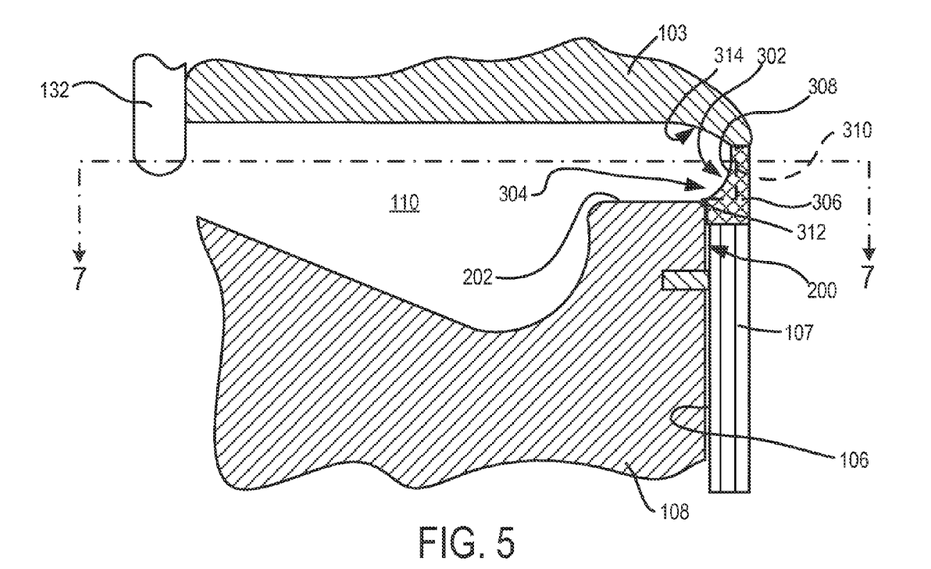
FIG. 5 is a detailed fragmented view of one embodiment for a concave flow deflector in accordance with the disclosure.
Figure 6:
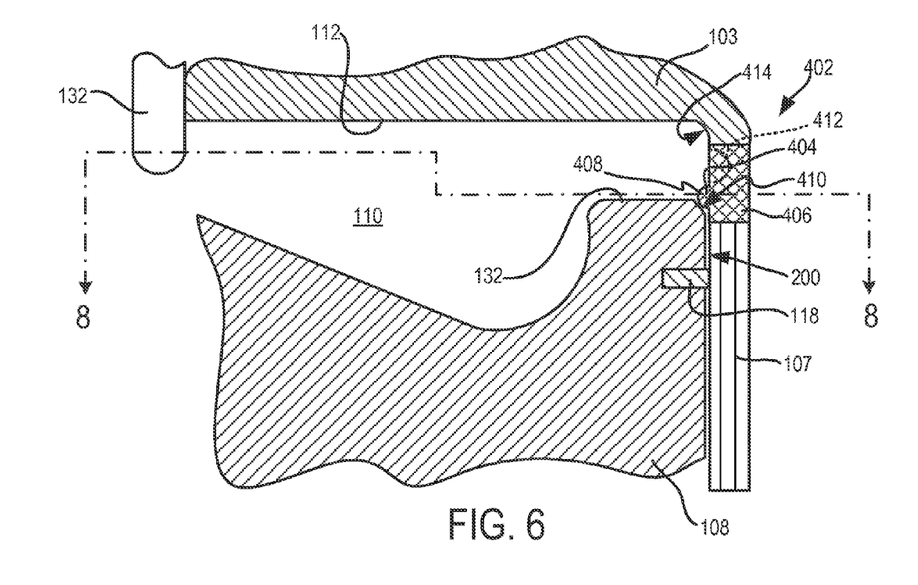
FIG. 6 is a detailed fragmented view of one embodiment for a convex flow deflector in accordance with the disclosure.

Accordingly, a first embodiment for a concave deflector structure 302 is shown in FIG. 5. As shown, the deflector structure 302 has a generally concave portion 304 formed in a body portion 306. The concave portion 304 is defined by a concave surface 308 having a curved shape. In an alternative embodiment, the concave portion 304 may be formed by two surfaces 310 that are disposed at a stepped-diameter portion of the body 306. The body portion 306 is generally annularly shaped and disposed at an end of the liner 107 adjacent the cylinder head 103. In other words, the deflector structure 302 is disposed such that the concave portion 304 is located above the crown surface 202 of the piston 108, i.e., closer to the flame deck 112 of the cylinder head 103, in an axial direction with respect to the center line of the bore 106. In general, the concave portion 304 can be located anywhere above the topmost piston ring 118, and may extend below and above the crown surface, i.e., span the crown surface in the axial direction with respect to a bore centerline anywhere between and including the flame deck at one end, and a reversal point of the topmost ring seal at another end.

Moreover, an overhang 312 may optionally be used in conjunction with the concave portion 304. As shown in FIG. 5, the optional overhang 312 may extend radially inward with respect to the bore 106 to at least partially cover the mouth opening of the region 200. In the illustrated embodiment, the deflector structure 302 is shown connected to the liner 107, but may alternatively be integrated therewith. In an alternative embodiment, for engines that do not have a liner, the concave portion 304 may be formed directly in the parent material of the cylinder case and/or portions of the deflector structure may be formed in the cylinder head of the engine. For illustration, a concave deflector structure 314 is formed in the cylinder head 103 along the rim of the bore 106.

During operation, a space within the concave portion 304 may provide an area for collecting and/or redirecting a fuel and/or a combustion product plume that was otherwise directed towards the wall of the bore 106 such that impingement of the plume against that wall and/or incursion of the fuel carried thereby into the mouth opening of the region 200 may be avoided or at least reduced. The portion of the plume that may enter the concave portion 304 may retain its momentum component along the crown surface such that it passes into the concavity without having an appreciable amount of fuel redirected into the mouth opening of the region 200, as was the case previously when the plume would impinge on and be redirected by the wall of the bore 106. After the plume of fuel and/or combustion products enters the concavity, the plume may be redirected back towards the interior of the variable volume 110.

An alternative embodiment for a convex deflector structure 402 is shown in FIG. 6. As shown, the deflector structure 402 has a generally convex protrusion 404 formed in a body portion 406. The convex protrusion 404 is defined by a convex surface 408 having a curved shape. In an alternative embodiment, the convex protrusion 404 may be formed by an annular ledge having three or more intersecting surfaces that are disposed at a stepped-diameter portion of the body 406. The body portion 406 is generally annularly shaped and disposed at an end of the liner 107 adjacent the cylinder head 103 such that the convex protrusion 404 is located above the crown surface 202 of the piston 108 and overhangs a portion of the mouth opening, i.e., it is disposed closer to the flame deck 112 of the cylinder head 103 in an axial direction with respect to the center line of the bore 106.

To accommodate the protrusion 404, a cutout, which is illustrated as a pronounced chamfer 410 in FIG. 6 along an outer edge of the crown surface 202, may be formed in the piston 108. In the illustrated embodiment, an optional concave feature 412 is shown in dotted line to illustrate that one or both of the concave and convex flow deflectors can be used together on the same cylinder, as desired. As in the previous embodiment, the deflector structure 402 is shown connected to the liner 107, but may alternatively be integrated therewith. In an alternative embodiment, for engines that do not have a liner, the convex protrusion 404 may be formed directly in the parent material of the cylinder case and/or cylinder head of the engine. In the illustrated embodiment, a concave chamfer 414 is formed in the cylinder head 103 along the rim of the bore 106.

During operation, the space above the crown surface of the piston 108 that is occupied by the convex protrusion 404 acts as a wall or obstruction for entry of fuel into the region 200. Stated differently, the convex protrusion 404 blocks the annular mouth opening of the region 200 such that the portion of the fuel plume traveling towards the wall of the bore 106 is blocked from entering the region 200, and is otherwise redirected away from the mouth opening. After fuel impinges the protrusion, the fuel may be redirected back towards the interior of the variable volume 110 and the flame deck 112.

Figure 7:
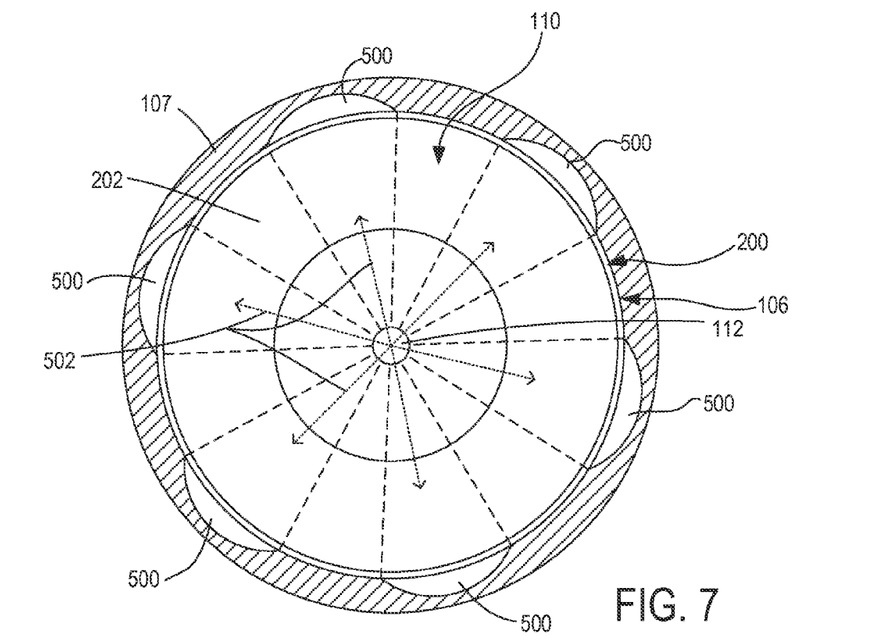
FIG. 7 is a top view of a fragmented engine cylinder in accordance with the disclosure.
Figure 8:
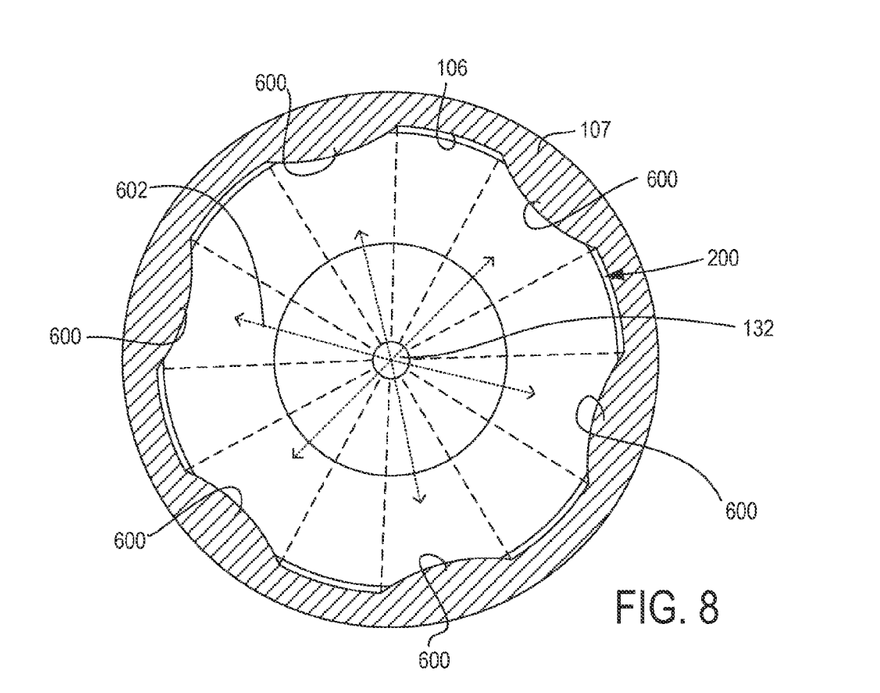
FIG. 8 is a top view of an alternative embodiment of an engine cylinder in accordance with the disclosure.

The flow deflector features described thus far, for example, the concave portion 304 and/or the convex protrusion 404, may extend substantially around the entire periphery of the bore 106, or may alternatively be formed in partial sections thereof that are determined to be susceptible to fuel and/or combustion product intrusion within the respective regions 200 (FIG. 2) of the engine. Such regions may be determined empirically for each engine design, and can include those radial locations around the bore 106 that are generally aligned with the fuel injection orifices formed in a fuel injector or other areas. A top view of two alternative and exemplary embodiments for engine cylinders are shown in FIGS. 7 and 8, in which various other surrounding engine components have been removed for clarity. The view in these illustrations are from the flame deck of the cylinder head, i.e., looking down into the bore at the top of the piston (the piston is not shown), or from the top down in the orientation of FIGS. 5 and 6.

FIG. 7 depicts the top surface of a cylinder bore 106, which surrounds the tip of the fuel injector 132 and corresponds to one embodiment in accordance with the structures shown in FIG. 5. As shown, a plurality or arcuate concave depressions 500 are formed at symmetrical locations around the inner periphery of the bore 106 such that they extend into the material forming the cylindrical liner 107. The concave depressions 500 are arranged around the entire bore 106 such that each depression 500 is aligned with a respective fuel jet 502 that emanates from the injector 132. The angular span of each depression 500, as denoted by the radially extending, dashed lines in FIG. 7, can be selected to correspond to the maximum expected plume radius of the fuel jets 502 to ensure full coverage of the mouth opening of the region 200, which lies around the outer periphery of the crown surface 202 and within an inner periphery of the bore 106.

Similarly, FIG. 8 depicts the top surface of an alternative embodiment for the cylinder bore 106, which surrounds the tip of the fuel injector 132 and corresponds to one embodiment in accordance with the structures shown in FIG. 6. As shown, a plurality or arcuate convex protrusions 600 are formed at symmetrical locations around the inner periphery of the bore 106 such that they extend into the bore 106. The convex protrusions 600 are disposed around the entire bore 106 such that each protrusion 600 is aligned with a respective fuel jet 602 that emanates from the injector 132. The angular span of each protrusion 600, as denoted by the radially extending, dashed lines in FIG. 8, can be selected to correspond to the maximum expected plume radius of the fuel jets 602 to ensure full coverage of the mouth opening of the region 200, which lies around the outer periphery of the top land 202 and within an inner periphery of the bore 106.

In general, any combination of recesses or protrusions can be used in a given engine cylinder. For example, a single engine cylinder may include one or more recesses, and also one or more protrusions, depending on the distribution and momentum of fuel and combustion products within the cylinder during engine operation across the entire engine operating range.

INDUSTRIAL APPLICABILITY

The present disclosure is applicable to internal combustion engines and, specifically, engines having reciprocating pistons. In the disclosed embodiments, an engine having a fuel injector configured to inject fuel directly into a respective engine cylinder is described, but such embodiment is exemplary and should not be understood as limiting to the scope of the invention. In general, the present disclosure is applicable to any engine type, including spark ignition or compression ignition engines. Further, the present disclosure applies to engines operating with any one or more fuel types such as gasoline, diesel, natural or liquid petroleum gas, and other fuels and/or mixtures of fuels. The fuel delivery into the engine cylinders may be accomplished by direct injection, or may be provided upstream of the cylinders, for example, in an intake manifold of the engine, an intake runner of the cylinder, and other delivery modes. Lastly, although a four- or six-stroke engine is described, other combustion system configurations having fewer than four or more than six strokes are contemplated, and even other combustion system arrangements such as split combustion arrangements.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising:
   a cylinder case forming a cylinder bore, the cylinder bore having a centerline and an inner bore surface that at least partially defines a variable volume;
   a piston slidably and sealably disposed within the cylinder bore, the piston forming a crown surface and having a topmost ring seal groove;
   wherein a region having a generally hollow cylindrical shape is defined between the piston and the cylinder bore in a radial direction with respect to the centerline, the region having a mouth opening with an annular shape that surrounds the crown surface and is defined between the piston and the cylinder bore;
   a cylinder head disposed to cover an open end of the cylinder bore such that the variable volume is defined within the cylinder bore between the cylinder head and the piston, the cylinder head forming a flame deck in fluid contact with the variable volume;
   a deflector structure disposed along a portion of the inner bore surface adjacent the flame deck, the deflector structure disposed between the topmost ring seal groove and the flame deck in an axial direction with respect to the centerline when the piston is disposed at a top dead center (TDC) position within the cylinder bore in the axial direction;
   wherein the deflector structure includes a concave depression formed in a body portion of the deflector structure, the concave depression defining a space disposed outwardly in the radial direction with respect to the mouth opening;
   wherein the deflector structure extends partially around a periphery of the cylinder bore along one or more depressed segments; and
   wherein the deflector structure comprises a plurality of segments, each of the plurality of segments being angularly aligned with a fuel spray provided in the variable volume by an injector having a spray orifice.

2. The internal combustion engine of claim 1, wherein the piston is moveable between the TDC and a bottom dead center (BDC) position in the axial direction, wherein the crown surface of the piston is closest to the flame deck when the piston is at the TDC position in the axial direction, and wherein the deflector structure spans the crown surface such that portions of the deflector structure extend above and below the crown surface when the piston is disposed at the TDC position.

3. The internal combustion engine of claim 1, wherein the cylinder case forms a plurality of cylinder bores defining a plurality of variable volumes, each of the plurality of variable volumes including a respective piston and a respective deflector structure.

4. The internal combustion engine of claim 1, wherein the topmost ring seal groove is configured to accept a ring seal that slidably and sealably engages the inner bore surface, wherein the region is further defined between the topmost ring seal groove and the crown surface in the axial direction, and wherein the deflector structure is disposed between the flame deck and the topmost ring seal groove.

5. The internal combustion engine of claim 1, wherein the plurality of segments are arranged around the cylinder bore.

6. The internal combustion engine of claim 1, wherein the deflector structure includes a convex protrusion formed in a body portion of the deflector structure and extending radially inwardly in the radial direction to overhang at least a portion of the mouth opening.

7. The internal combustion engine of claim 6, wherein the convex protrusion forms a ledge that extends at least partially around a periphery of the cylinder bore along one or more segments.

8. The internal combustion engine of claim 7, wherein the convex protrusion comprises a plurality of segments, each of the plurality of segments being angularly aligned with a fuel spray provided in the variable volume by an injector having a spray orifice.

9. The internal combustion engine of claim 6, wherein the piston forms a cutout along an outer peripheral edge thereof surrounding the crown surface, wherein the cutout provides a clearance to the piston with respect to the convex protrusion.

10. The internal combustion engine of claim 1, wherein the deflector structure is arranged and configured to redirect a plume of fuel and/or combustion products travelling along the crown surface and/or the flame deck towards the inner bore surface and away from the mouth opening.

11. The internal combustion engine of claim 1, wherein the deflector structure is arranged and configured to redirect a plume of fuel and/or combustion products travelling along the crown surface and/or the flame deck towards an interior of the variable volume.

12. The internal combustion engine of claim 1, wherein the deflector structure is arranged and configured to redirect a plume of fuel and/or combustion products travelling along the crown surface and/or the flame deck towards the flame deck surface.

13. An internal combustion engine having a cylinder bore formed in a cylinder case, the cylinder bore having a centerline and an inner bore surface that at least partially defines a variable volume, a cylinder head disposed to cover an open end of the cylinder bore such that the variable volume is defined within the cylinder bore between the cylinder head and a piston, the cylinder head forming a flame deck in fluid contact with the variable volume, and the piston being slidably and sealably disposed within the cylinder bore, the piston forming a crown surface, the internal combustion engine comprising:

a topmost ring seal groove formed in the piston and adapted to accommodate a ring seal disposed for sealing and sliding engagement with the inner bore surface;

a region having a generally hollow cylindrical shape defined between an outer wall of the piston and the inner bore surface in a radial direction with respect to the centerline, the region having an annularly shaped mouth opening disposed radially outward relative to the crown surface and defined between the piston and the cylinder bore;

the region being further defined between the topmost ring seal groove and the annularly shaped mouth opening in an axial direction with respect to the centerline;

a deflector structure forming a portion of the inner bore surface adjacent the flame deck, the deflector structure disposed between the flame deck and the topmost ring seal groove in the axial direction when the piston is at a top dead center (TDC) position within the cylinder bore;

wherein the deflector structure includes a convex protrusion formed in a body portion of the deflector structure and extending radially inwardly to overhang a portion of the annularly shaped mouth opening, wherein the piston is moveable between the TDC position and a bottom dead center (BDC) position in the axial direction, and wherein the crown surface of the piston is closest to the flame deck when the piston is at the TDC position in the axial direction.

14. The internal combustion engine of claim 13, wherein the deflector structure extends partially around a periphery of the cylinder bore along one or more protruding segments.

15. The internal combustion engine of claim 14, wherein the convex protrusion forms a ledge that extends at least partially around the periphery of the cylinder bore along one or more segments.

* * * * *